Patented May 22, 1951

2,554,125

UNITED STATES PATENT OFFICE 2,554,125

NEGATIVE PLATE FOR ALKALINE ACCUMULATOR AND METHOD OF MAKING SAME

Jean Salauze, Paris, France, assignor to Société des Accumulateurs Fixes et de Traction, Romainville, Seine, France, a French body corporate No Drawing. Application March 19, 1947, Serial No. 735,803. In France January 19, 1946

Section 1, Public Law 690, August 8, 1946
Patent expires January 19, 1966

7 Claims. (Cl. 136—24)

1

The present invention relates to the manufacture of negative plates for electric storage batteries adapted to operate with an alkaline electrolyte.

It is a known fact that plates for electric storage devices or batteries, and quite particularly negative plates, may be prepared by means of a material called substratum consisting of a porous electric conductor and remaining unaltered when the storage device is being charged and discharged, and of an active material which is situated in the pores of the said substratum. In this case a concentrated solution of the salt of the metal constituting the active material is decomposed in the pores so as to form a hydrate or pure metal serving as the active element.

This known method is however disadvantageous for the reason that it is very long and expensive. In fact, it requires the following steps: preparation of the substratum from a fine metallic powder which is to be placed on a grid; a subsequent heating producing a superficial melting of these fine particles; impregnation of this substratum with the solution of the corresponding salt wherefrom said active element is to be formed; the decomposition of this salt; the washing and the drying of the plate thus obtained for elimination of the alkaline salts of the strong acids which may thus be formed. It is moreover always necessary to repeat this cycle of operations several times in order to obtain a plate having the required qualities.

The present invention has for its object to obviate those disadvantages and relates to a process for the preparation of such plates for electric batteries and storage devices which is chiefly remarkable in that it consists of mixing in a desired proportion the metal adapted to form the substratum after a fine powder has been obtained therefrom, with the material adapted to form the active element, said material also being used in powder form, placing said mixture in the dry state upon frames used as supports for said plates, and submitting the whole to an energetic compression, preferably in the cold state. Said frames may consist of a grid of any kind or have any other known structure.

According to another feature of the invention, the metal used as substratum and preferably also the metal forming the active element, are employed in that state in which their crystalline structure is of the arborescent, dendritical or needle-like type.

It has been observed that in this case plates could be obtained of a very strong and reliable nature, these qualities being chiefly due to the manner in which said needles cooperate or work together or hook together. The cohesion of such plates is sufficient to enable their immediate use as electrodes in a storage device or in a battery. Furthermore the operations which consist to charge and to discharge the storage device do not affect the said cohesion so that the said plates may be used without fearing any serious loss of materials.

The substratum may consist of copper for instance, whereas the active material may consist of cadmium, of a mixture of cadmium and of iron, or of any other suitable element or elements.

In this way the long and expensive method known heretofore is replaced by a quite new and interesting process which may be executed during a single operative step.

It is obvious that various operative manners may be used in order to obtain the copper substratum or any other suitable metal in the form of dendrites or arborescent crystals, which are particularly adapted for the present invention. Two examples will be given hereafter, but it is, of course, possible without departing from the spirit of the invention to imagine many other methods.

(1) A concentrated solution of copper sulfate is used and the copper is removed by the action of a suitably divided aluminum powder.

(2) Use is made of a slightly acid solution of copper sulfate which is subjected to the electrolysis for instance with copper electrodes. This latter is executed with a current of high density per square inch so as to provide for the formation on the cathode of a deposit of spongy copper.

In the same manner the active element may be obtained by the electrolysis (in the case of a mixture of iron and of cadmium) of a suitable solution of iron- and cadmium salts such as sulfates, for instance under a high current density so as to obtain said necessary crystalline structure.

The materials for instance copper constituting the substratum and the active element of the plate are taken in the desired proportions corresponding to the intended use of said plate, and are thoroughly mixed together in the dry state. Care must, of course, be taken in order that the needle-like or dendritical crystals should not be affected by this mixing. Any suitable mixer of the known or unknown type may be used.

As soon as the mixture is obtained, it is disposed on a suitable support, for instance on a kind of frame, and subjected to a high compression preferably in the cold state.

The plate which is thus realised has all the designed qualities which permit its use in any storage device or electric battery.

If desired, use can be made of cadmium hydrate instead of cadmium and iron, and said hydrate can be mixed with copper. Cadmium hydrate can also be replaced by a mixture of cadmium hydrate and iron, said latter mixture being naturally prepared in advance. It should be observed that cadmium hydrate has not the suitable properties which would favorise the cohesion of the final plate. This is the reason why it is suggested to use in such a case a greater proportion of copper crystals, so that said latter should form when being compressed a suitable network which would surround and hold together the particles of the cadmium hydrate which cannot be obtained in the form of dendrites.

By way of example, the following proportions may be used:

25 per cent to 50 per cent of substratum
75 per cent to 50 per cent of the active element such as a mixture of iron and cadmium.

When cadmium hydrate is used the following proportions may be employed:

50 per cent to 75 per cent of substratum
50 per cent to 25 per cent of cadmium hydrate.

The invention also concerns the plates for use in electric batteries and storage devices obtained in accordance with the above new process and chiefly remarkable in that they are constituted by compressed mixture of the material forming the substratum with the material forming the active element, both materials being used in the powder form.

The invention also relates to all kinds of devices and apparatus using the said plates or electrodes obtained in accordance with the above process, and quite particularly the storage devices and electric batteries using same.

Obviously the said invention is by no means limited to the described embodiments and proportions which have been given solely by way of example.

As used in the claims herein the expression "of interlacing form," as applied to crystals, means that the crystal shapes or the boundaries of the crystal have such irregularities of configuration that the crystals will interlace and hang together.

Having now described and ascertained the nature of my said invention what I claim as new and desire to secure by Letters Patent is:

1. A process for the preparation of negative plates adapted for use in electric storage batteries employing alkaline electrolyte and comprising a mixture of substratum and active material, comprising the steps of mixing in a desired proportion metal adapted to form the substratum, and being finely divided crystals of interlacing form, with material adapted to form the active material and being in finely divided form, thereafter placing this mixture in a dry state upon suitable supports forming a part of the plate, and finally compressing the mixture without increase of temperature to the fusion point of any constituent thereof and forming a compact porous plate.

2. A process according to claim 1 in which the particles of the finely divided material adapted to form the active material comprise crystals of interlacing form.

3. A process according to claim 1 in which the metal adapted to form the substratum is copper.

4. A process according to claim 1 in which the material adapted to form the active material is prepared by the step of electrolysis under high current density of a solution of cadmium salt and iron salt.

5. A process according to claim 1 in which the material adapted to form the active material comprises cadmium hydrate and iron and constitutes approximately 50% to 25% of said mixture, and the metal adapted to form the substratum is copper.

6. A process according to claim 1 in which the particles of the finely divided material adapted to form the active material comprise crystals of interlacing form and said material comprises iron and cadmium and constitutes approximately 75% to 50% of said mixture, and the metal adapted to form the substratum is copper.

7. A negative plate adapted for use in electric storage batteries employing alkaline electrolyte and comprising a mixture of substratum and active material, prepared in accordance with the process of claim 1.

JEAN SALAUZE.

REFERENCES CITED

The following references are of record in the file of this patent:

UNITED STATES PATENTS

| Number | Name | Date |
| --- | --- | --- |
| 931,081 | Perry | Aug. 17, 1909 |
| 979,064 | Estelle | Dec. 20, 1910 |
| 983,430 | Estelle | Feb. 7, 1911 |
| 1,079,346 | Hubbell | Nov. 25, 1913 |
| 1,531,618 | Kotera | Mar. 31, 1925 |
| 1,885,451 | Kraenzlein | Nov. 1, 1932 |
| 2,213,128 | Langguth | Aug. 27, 1940 |
| 2,330,018 | Van Wert | Sept. 21, 1943 |

FOREIGN PATENTS

| Number | Country | Date |
| --- | --- | --- |
| 311,141 | Great Britain | May 9, 1929 |